United States Patent
Morita et al.

(10) Patent No.: US 10,110,849 B2
(45) Date of Patent: Oct. 23, 2018

(54) COMMUNICATION TERMINAL, COMMUNICATION SYSTEM, COMMUNICATION CONTROL METHOD, AND NON-TRANSITORY RECORDING MEDIUM

(71) Applicants: Kenichiro Morita, Tokyo (JP); Takuya Imai, Tokyo (JP); Shoh Nagamine, Kanagawa (JP); Junpei Mikami, Kanagawa (JP)

(72) Inventors: Kenichiro Morita, Tokyo (JP); Takuya Imai, Tokyo (JP); Shoh Nagamine, Kanagawa (JP); Junpei Mikami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/622,793

(22) Filed: Jun. 14, 2017

(65) Prior Publication Data
US 2017/0366782 A1    Dec. 21, 2017

(30) Foreign Application Priority Data
Jun. 20, 2016 (JP) ................................. 2016-121892

(51) Int. Cl.
| H04N 7/14 | (2006.01) |
| H04L 12/18 | (2006.01) |
| H04N 7/15 | (2006.01) |

(52) U.S. Cl.
CPC ......... *H04N 7/147* (2013.01); *H04L 12/1822* (2013.01); *H04N 7/155* (2013.01)

(58) Field of Classification Search
USPC ...................................................... 348/14.07
See application file for complete search history.

(56) References Cited

U.S. PATENT DOCUMENTS

2008/0068446 A1* 3/2008 Barkley ................. H04N 7/147
                                                                 348/14.07
2014/0118475 A1    5/2014 Nagamine et al.
(Continued)

FOREIGN PATENT DOCUMENTS

| JP | 2007-150530 | 6/2007 |
| JP | 2013-153414 | 8/2013 |

(Continued)

*Primary Examiner* — Amal Zenati
(74) *Attorney, Agent, or Firm* — Oblon, McClelland, Maier & Neustadt, L.L.P.

(57) ABSTRACT

A communication terminal includes: a receiver to receive a plurality of items of content data respectively from a plurality of counterpart communication terminals through a session established between the communication terminal and the counterpart communication terminals via a communication network; and circuitry to: determine an available band of the communication network; select, from among the plurality of items of content data, one or more items of content data receivable by the communication terminal in accordance with the available band of the communication network and bands being used to receive the plurality of items of content data; and control a display to display information indicating the available band of the communication network in association with the selected one or more items of content data receivable by the communication terminal.

11 Claims, 12 Drawing Sheets

(56) References Cited

U.S. PATENT DOCUMENTS

| | | |
|---|---|---|
| 2014/0240450 A1 | 8/2014 | Morita et al. |
| 2014/0244460 A1 | 8/2014 | Imai et al. |
| 2014/0362718 A1 | 12/2014 | Nagamine et al. |
| 2014/0368410 A1 | 12/2014 | Imai et al. |
| 2015/0365727 A1* | 12/2015 | Nagamine .......... H04N 21/4621 725/62 |
| 2016/0080449 A1 | 3/2016 | Nagamine et al. |
| 2016/0094594 A1 | 3/2016 | Imai et al. |
| 2016/0094595 A1 | 3/2016 | Shiro et al. |
| 2016/0112675 A1 | 4/2016 | Morita et al. |
| 2016/0150183 A1 | 5/2016 | Nagamine et al. |
| 2016/0248819 A1 | 8/2016 | Nagamine et al. |
| 2016/0262206 A1 | 9/2016 | Shiro et al. |
| 2016/0277462 A1 | 9/2016 | Morita et al. |
| 2016/0366425 A1 | 12/2016 | Nagamine et al. |
| 2017/0012793 A1 | 1/2017 | Morita et al. |
| 2017/0031646 A1 | 2/2017 | Imai et al. |
| 2017/0034477 A1 | 2/2017 | Morita et al. |
| 2017/0034482 A1 | 2/2017 | Nagamine et al. |
| 2017/0085604 A1 | 3/2017 | Morita et al. |
| 2017/0094225 A1 | 3/2017 | Morita et al. |
| 2017/0134440 A1 | 5/2017 | Morita et al. |
| 2017/0134695 A1 | 5/2017 | Mikami et al. |
| 2017/0134697 A1 | 5/2017 | Imai et al. |

FOREIGN PATENT DOCUMENTS

| | | |
|---|---|---|
| JP | 2017-092844 | 5/2017 |
| WO | WO2006/057381 A1 | 6/2006 |

\* cited by examiner

FIG. 5A

| PRIORITY | DATA ID | IP ADDRESS OF CONTENT-DATA SENDER TERMINAL | BITRATE (bps) |
|---|---|---|---|
| 1 | V003 | 2.0.0.3 | 1M |
| 2 | V002 | 2.0.0.2 | 750K |
| 3 | V001 | 2.0.0.1 | 500K |

FIG. 5B

| SESSION ID | IP ADDRESS OF PARTICIPANT TERMINAL |
|---|---|
| se101 | 2.0.0.1, 2.0.0.2, 2.0.0.3 |
| se102 | 2.1.0.1, 2.1.0.2, 2.1.0.3 |
| se103 | 2.2.0.1, 2.2.0.2, 2.2.0.3 |
| ... | ... |

FIG. 5C

| SESSION ID | DATA ID | IP ADDRESS OF STOP-REQUEST SENDER TERMINAL |
|---|---|---|
| se101 | V001 | 2.0.0.2 |
| se101 | V002 | 2.0.0.2 |
| se101 | V003 | 2.0.0.3 |
| ... | ... | ... |

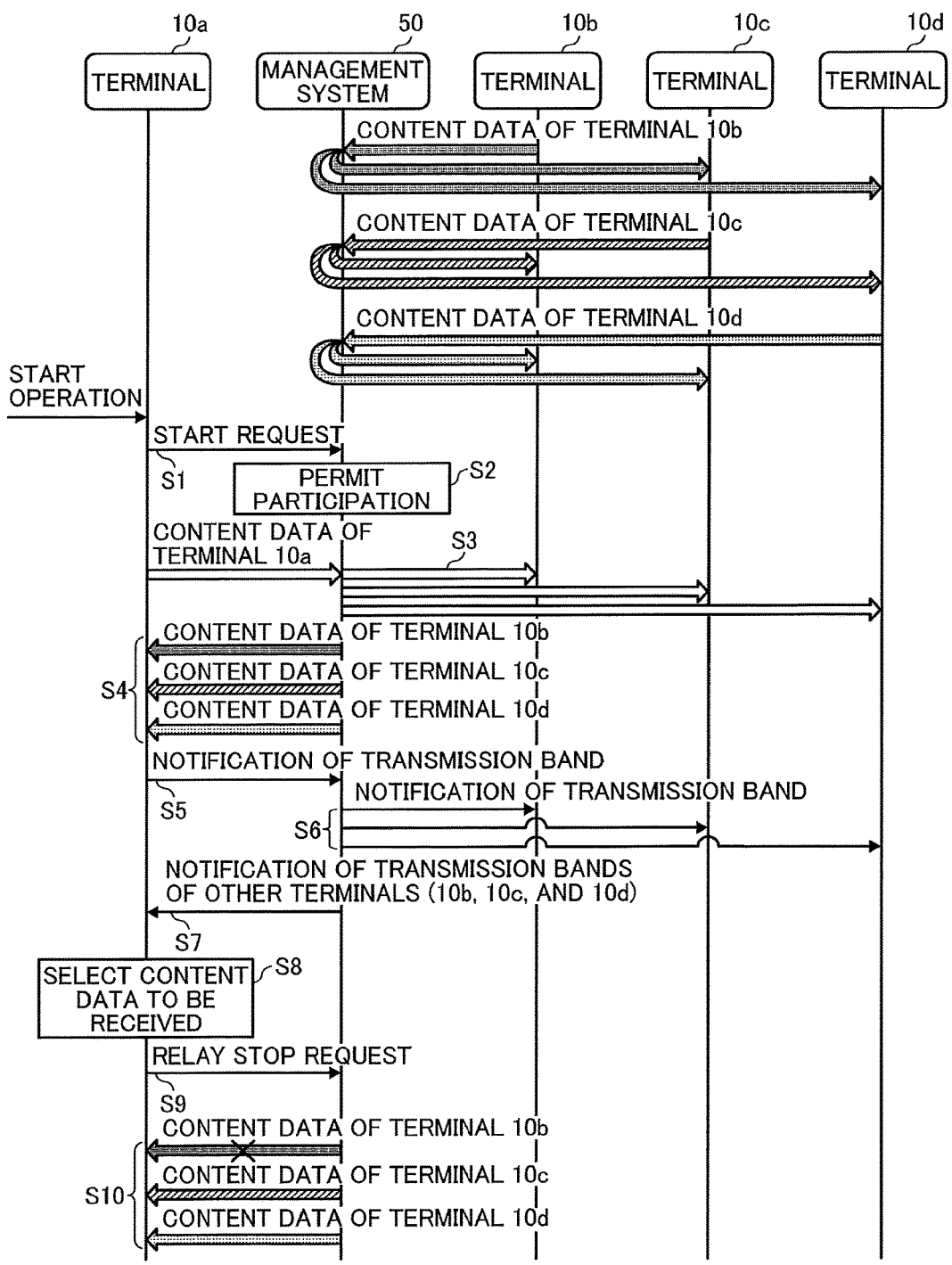

COMMUNICATION TERMINAL, COMMUNICATION SYSTEM, COMMUNICATION CONTROL METHOD, AND NON-TRANSITORY RECORDING MEDIUM

CROSS-REFERENCE TO RELATED APPLICATIONS

This patent application is based on and claims priority pursuant to 35 U.S.C. § 119(a) to Japanese Patent Application No. 2016-121892, filed on Jun. 20, 2016, in the Japan Patent Office, the entire disclosure of which is hereby incorporated by reference herein.

BACKGROUND

Technical Field

The present invention relates to a communication terminal, a communication system, a communication control method, and a non-transitory recording medium.

Description of the Related Art

Recently, communication systems that enable voice communication or a videoconference via a communication network such as the Internet or a dedicated line have been widely used due to a demand for reducing the traveling cost and time of conference participants. In such communication systems, in response to the start of communication between communication terminals, the communication terminals transmit and receive content data including image data and audio data to realize communication between the conference participants. In addition, there is a technique for estimating in real time an available band of the communication network that can be utilized by a communication terminal.

SUMMARY

Example embodiments of the present invention include a communication terminal including: a receiver to receive a plurality of items of content data respectively from a plurality of counterpart communication terminals through a session established between the communication terminal and the counterpart communication terminals via a communication network; and circuitry to: determine an available band of the communication network; select, from among the plurality of items of content data, one or more items of content data receivable by the communication terminal in accordance with the available band of the communication network and bands being used to receive the plurality of items of content data; and control a display to display information indicating the available band of the communication network in association with the selected one or more items of content data receivable by the communication terminal.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 5A to 5C are illustrations of management tables managed by the terminal or the management system;

FIG. 6 is a sequence diagram illustrating an example of a process performed when a terminal participates in a session;

Figure 1:
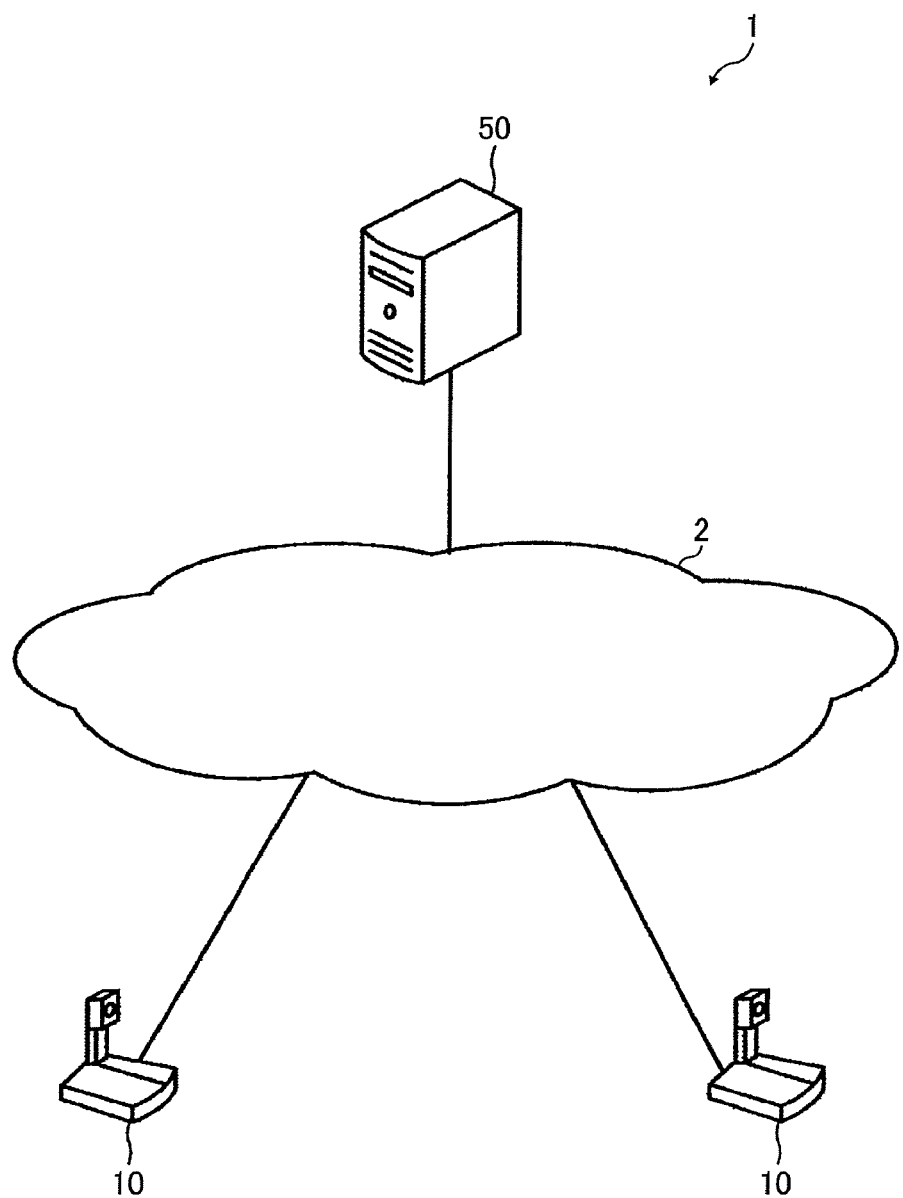
FIG. 1 is a schematic diagram of a communication system according to an embodiment of the present invention.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

An embodiment of the present invention will be described below.

<<Overview of Communication System>>

FIG. 1 is a schematic diagram of a communication system according to an embodiment of the present invention. As illustrated in FIG. 1, a communication system 1 includes a plurality of communication terminals 10 and a management system 50. Hereinafter, the communication terminals 10 are simply referred to as the terminal 10.

The terminal 10 transmits and receives image data and audio data, which serve as an example of content data, to and from a counterpart terminal 10 and the management system 50 to perform communication with the counterpart terminal 10 and the management system 50. The terminal 10 may be a general-purpose terminal or a dedicated terminal. The terminal 10 may be, for example, a videoconference terminal, an electronic whiteboard, an electronic signage, a telephone terminal, a tablet, a smartphone, a camera, or a personal computer (PC).

The management system 50 manages communication between the terminals 10. For example, the management system 50 performs call control for establishing communication between the terminals 10. For example, the management system 50 transmits content data received from one terminal 10 to the other terminal 10 to relay the content data between the terminals 10.

To simplify the description, FIG. 1 illustrates the case where the management system 50 is implemented by a single apparatus. However, the present invention is not limited to such an embodiment. For example, the management system 50 may be implemented by a plurality of apparatuses such that the call control function and the content data relay function of the management system 50 are assigned to different apparatuses. In addition, to simplify the description, FIG. 1 illustrates the case where the communication system 1 includes two terminals 10. However, the present invention is not limited to such an embodiment. The communication system 1 may include three or more terminals 10. The terminals 10 may be of the same kind as in the case where all the terminals 10 are videoconference terminals or may be of different kinds as in the case where the terminals 10 include videoconference terminals and PCs. The content data may be transmitted directly between the terminals 10 instead of being relayed by the management system 50. Any one of the terminals 10 may have the content data relay function.

<<Hardware Configuration>>

Hardware configurations of the terminal 10 and the management system 50 of the communication system 1 are described next.

Figure 2:
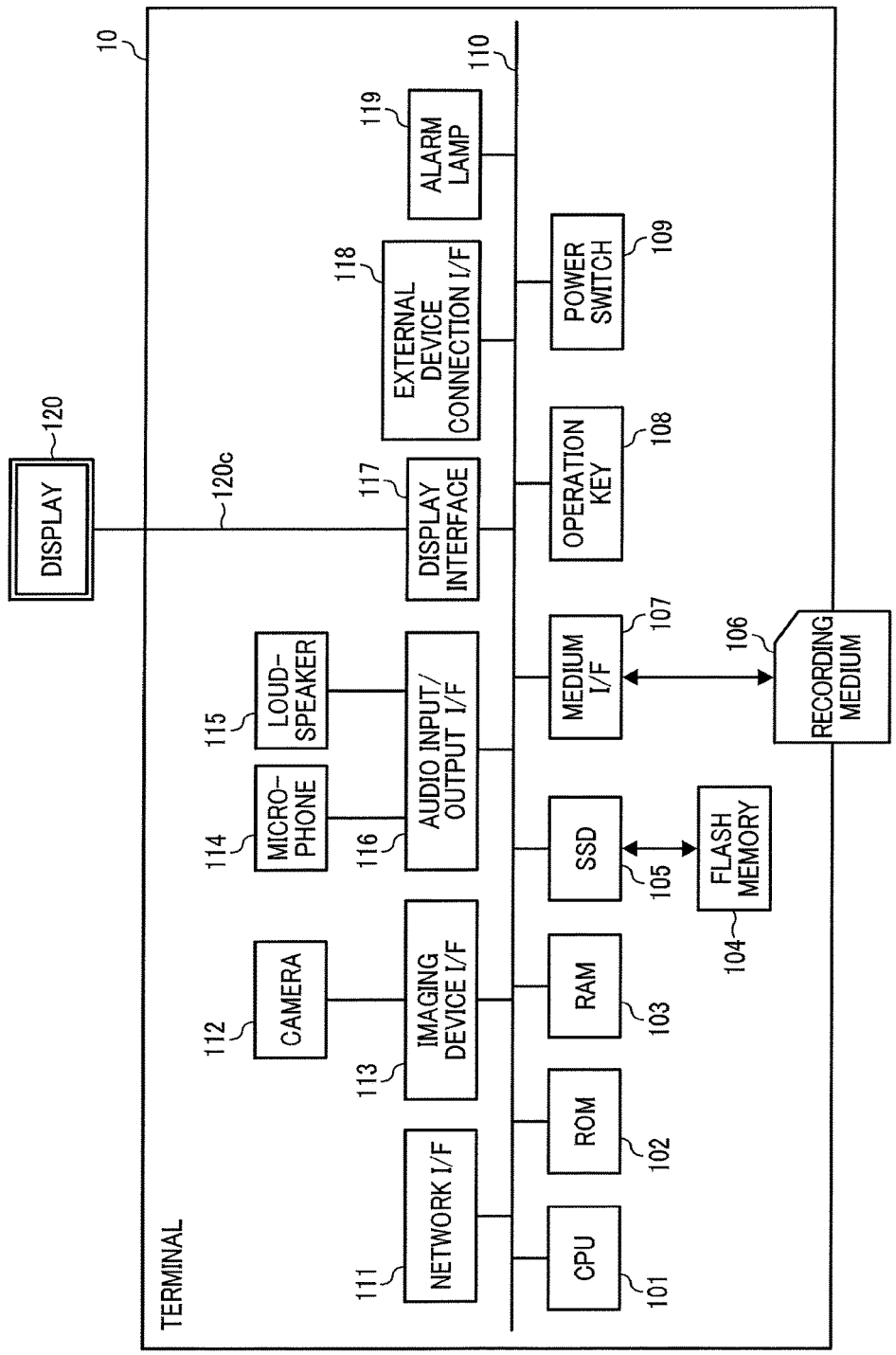
FIG. 2 is a diagram illustrating a hardware configuration of a terminal according to the embodiment.

FIG. 2 is a diagram illustrating a hardware configuration of the terminal 10 according to the embodiment. Note that the hardware configuration of the terminal 10 is not limited to the configuration illustrated in FIG. 2. For example, the terminal 10 may additionally include a configuration not illustrated in FIG. 2, or part of the configuration illustrated in FIG. 2 may be omitted from the terminal 10. Part of the configuration illustrated in FIG. 2 may be implemented by, for example, an external device that is connectable to the terminal 10.

As illustrated in FIG. 2, the terminal 10 according to the embodiment includes a central processing unit (CPU) 101, a read-only memory (ROM) 102, a random access memory (RAM) 103, a flash memory 104, a solid state drive (SSD) 105, a medium interface (I/F) 107, an operation key (keys) 108, a power switch 109, and a network I/F 111. The CPU 101 controls entire operation of the terminal 10. The ROM 102 stores a program used to drive the CPU 101, such as an initial program loader (IPL). The RAM 103 is used as a work area for the CPU 101. The flash memory 104 stores various programs used in the terminal 10 and various kinds of data, such as image data and audio data. The SSD 105 controls reading or writing of various kinds of data from or to the flash memory 104 under control of the CPU 101. The medium I/F 107 controls reading or writing (storage) of data from or to a recording medium 106, such as a flash memory or an integrated circuit (IC) card. The operation key(s) 108 are operated to select a counterpart terminal of the terminal 10. The power switch is used to power on or off the terminal 10. The network I/F 111 enables data transmission via a communication network 2.

The terminal 10 also includes a camera 112, an imaging device I/F 113, a microphone 114, a loud-speaker 115, an audio input/output I/F 116, a di splay I/F 117, an external device connection I/F 118, an alarm lamp 119, and a bus line 110. The camera 112 is of a built-in type and captures an image of a subject and acquires image data under control of the CPU 101. The imaging device I/F 113 controls driving of the camera 112. The microphone 114 is of a built-in type and receives input sound. The loud-speaker 115 is of a built-in type and outputs sound. The audio input/output I/F 116 processes a sound signal input from the microphone 114 and a sound signal to be output to the loud-speaker 115 under control of the CPU 101. The display I/F 117 sends image data to an external display 120 under control of the CPU 101. The external device connection I/F 118 is used to connect various external devices to the terminal 10. The alarm lamp 119 indicates abnormal states of various functions of the terminal 10. The bus line 110 includes an address bus and a data bus for electrically connecting the aforementioned components in a manner as illustrated in FIG. 2.

The display 120 is a display, such as a display of liquid crystals or organic electroluminescence, which displays an image of a subject, an operation icon, etc. The display 120 is connected to the display I/F 117 by a cable 120c. The cable 120c may be an analog red, green, and blue (RGB) (Video Graphics Array (VGA)) signal cable, a component video cable, a High-Definition Multimedia Interface (HDMI) (registered trademark) signal cable, or a Digital Video Interactive (DVI) signal cable.

The camera 112 includes a lens and a solid-state imaging element that converts light into electric charge to convert an image (video) of a subject into electronic data. An image sensor, such as a complementary metal oxide semiconductor (CMOS) image sensor or a charge coupled device (CCD) image sensor, is used as the solid-state imaging element.

External devices, such as an external camera, an external microphone, and an external speaker, are each electrically connectable to the external device connection I/F 118 by using a Universal Serial Bus (USB) cable or the like. When an external camera is connected to the terminal 10, the external camera is driven preferentially to the built-in camera 112 under control of the CPU 101. Likewise, when an external microphone is connected to the terminal 10, the external microphone is driven preferentially to the built-in microphone 114 under the control of the CPU 101. When an external speaker is connected to the terminal 10, the external speaker is driven preferentially to the built-in speaker 115 under the control of the CPU 101.

The recording medium 106 is removable from the terminal 10. In addition, the flash memory 104 may be replaced with any non-volatile memory subjected to data reading or writing under control of CPU 101, and an electrically erasable and programmable ROM (EEPROM) or the like may be used.

Figure 3:
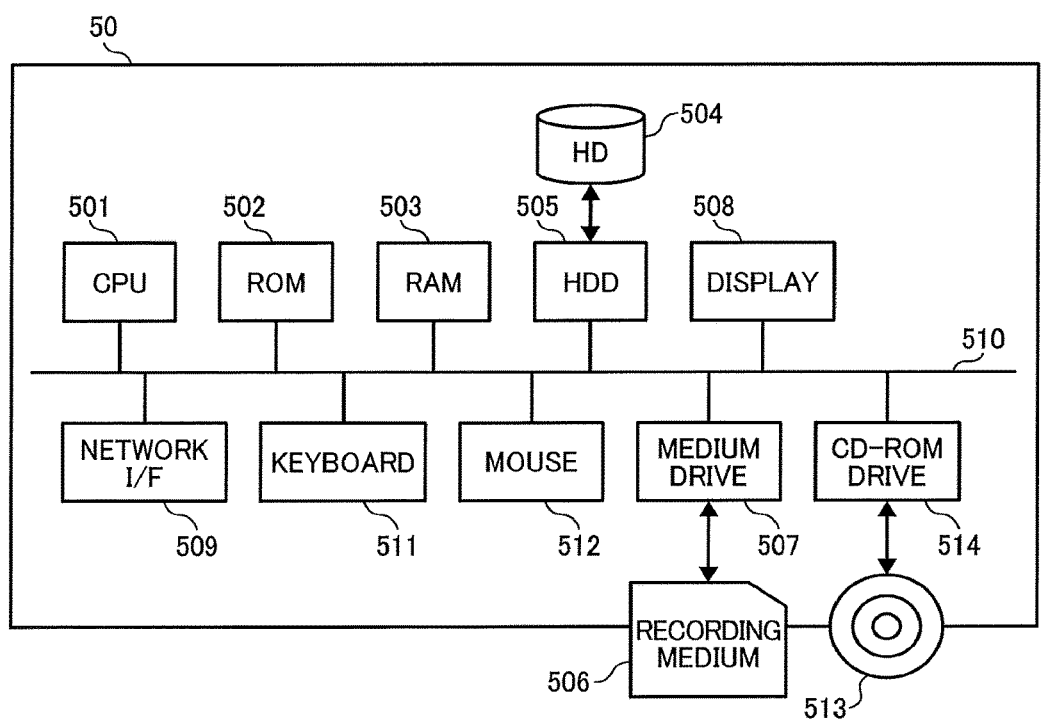
FIG. 3 is a diagram illustrating a hardware configuration of a management system according to the embodiment.

FIG. 3 is a diagram illustrating a hardware configuration of the management system 50 according to the embodiment. The management system 50 includes a CPU 501, a ROM 502, a RAM 503, a hard disk (HD) 504, a hard disk drive (HDD) 505, a medium drive 507, a display 508, a network I/F 509, a keyboard 511, a mouse 512, a Compact Disc-Read Only Memory (CD-ROM) drive 514, and a bus line 510. The CPU 501 controls operations of the entire management system 50. The ROM 502 stores a program used to drive the CPU 501, such as an IPL. The RAM 503 is used as a work area for the CPU 501. The HD 504 stores various kinds of data, such as programs for the management system 50. The HDD 505 controls reading or writing of various kinds of data from or to the HD 504 under control of the CPU 501. The medium drive 507 controls reading or writing (storage) of data from or to a recording medium 506, such as a flash memory. The display 508 displays various kinds of information, such as a cursor, a menu, a window, text, or an image. The network IN 509 enables data communication via the communication network 2. The keyboard 511 includes a plurality of keys used to input characters, numerical values, and various instructions. The mouse 512 is used to select or execute various instructions, to select a processing target, and to move the cursor. The CD-ROM drive 514 controls reading or writing of various kinds of data from or to a CD-ROM 513, which is an example of a removable recording medium. The bus line 510 includes an address bus and a data bus for electrically connecting the aforementioned components in a manner as illustrated in FIG. 3.

<<Functional Configuration>>

Figure 4:
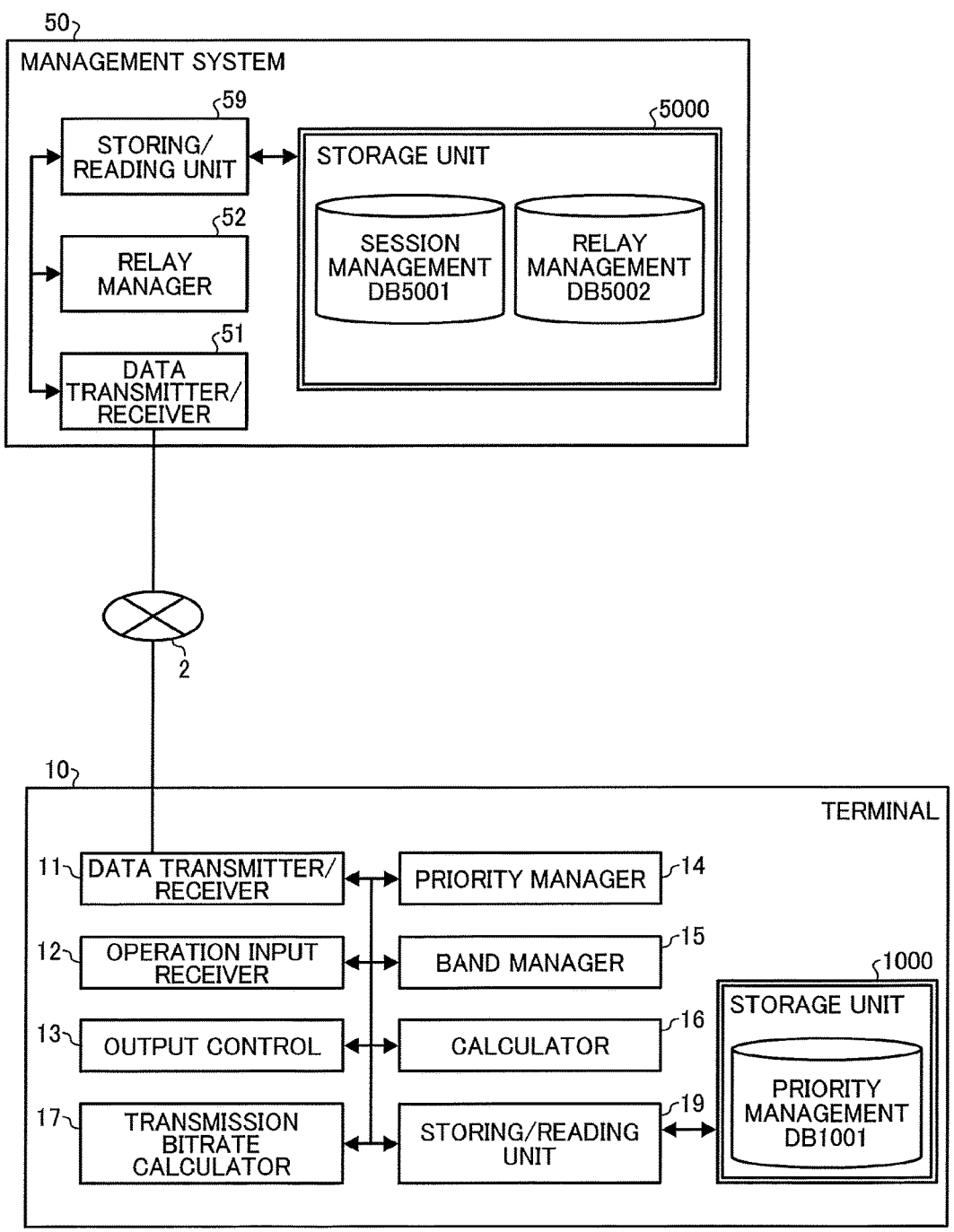
FIG. 4 is a block diagram illustrating functions of the terminal and the management system according to the embodiment.

Next, a functional configuration according to the embodiment is described. FIG. 4 is a block diagram illustrating functions of the terminal 10 and the management system 50 of the communication system 1 according to the embodiment. Referring to FIG. 4, the terminal 100 and the management system 50 are connected to each other via the communication network 2 to be able to communicate with each other.

<Functional Configuration of Terminal>

Any of the components illustrated in FIG. 2 operates in accordance with a command from the CPU 101 operating according to a program loaded from the flash memory 104 into the RAM 103. The terminal 10 includes a storage unit 1000 implemented by the ROM 102, the RAM 103, and the flash memory 104 illustrated in FIG. 2.

(Priority Management Table)

FIG. 5A is an illustration of a priority management table. The storage unit 1000 stores a priority management database (DB) 1001 configured as the priority management table. The priority management table stores, for each content data, a priority indicating the reception priority of content data, a bitrate of the content data, a data ID of the content data, and an Internet Protocol (IP) address of the terminal 10 that is a sender of the content data in association with one another. In the priority management table, the smaller priority value indicates the higher priority. Data IDs "V001", "V002", and "V003" indicate video data transmitted from the respective terminals (10a, 10b, and 10c). Note that the priority need not necessarily be represented by a numerical value and may be represented using a symbol or text.

(Functional Unit of Terminal)

The functional units of the terminal 10 are described in detail with reference to FIGS. 2 and 4. In the following description of the functional units of the terminal 10, a relationship between the functional unit of the terminal 10 and hardware for achieving the functional unit in FIG. 2 is also described. The terminal 10 includes a data transmitter/receiver 11, an operation input receiver 12, an output control 13, a priority manager 14, a band manager 15, a calculator 16, a transmission bitrate calculator 17, and a storing/reading unit 19.

The data transmitter/receiver 11 is implemented by a command from the CPU 101 and by the network I/F 111. The data transmitter/receiver 11 transmits and receives various kinds of data (or information) to and from a counterpart terminal, device, or system via the communication network 2.

The operation input receiver 12 is implemented by a command from the CPU 101, the operation keys 108, and the power switch 109. The operation input receiver 12 receives various inputs and selections made by the user.

The output control 13 is implemented by a command from the CPU 101 and the display I/F 117. The output control 13 controls to output, to the display 120, content data, such as image data and video data, received from a corresponding counterpart terminal in performing communication. The output control 13 is implemented by a command from the CPU 101 and the audio input/output I/F 116. The output control 13 controls to output, from the loud-speaker 115, audio data received from the counterpart terminal in performing communication.

The priority manager 14 is implemented by a command from the CPU 101 and manages the priority of content data received by the terminal 10.

The band manager 15 is implemented by a command from the CPU 101 and manages an available band of the communication network 2.

The calculator 16 is implemented by a command from the CPU 101 and calculates various numerical values based on information such as the available band determined by the band manager 15.

The transmission bitrate calculator 17 is implemented by a command from the CPU 101 and calculates a band (bitrate) of video data transmitted from the terminal 10.

The storing/reading unit 19 is implemented by a command from the CPU 101 and by the SSD 105 or is implemented by a command from the CPU 101. The storing/reading unit 19 performs processing to store various kinds of data in the storage unit 1000 and to extract various kinds of data stored in the storage unit 1000.

<Functional Configuration of Management System>

Any of the components illustrated in FIG. 3 operates in accordance with a command from the CPU 501 operating according to a program for the management system 50 that is loaded from the HD 504 into the RAM 503. The management system 50 includes a storage unit 5000 implemented by the HD 504.

(Session Management Table)

FIG. 5B is an illustration of a session management table. The storage unit 5000 stores a session management DB 5001 configured as the session management table. The session management table stores a session ID of a session used to transmit content data between the terminals 10 and IP addresses of participant terminals participating in that session in association with each other.

(Relay Management Table)

FIG. 5C is an illustration of a relay management table. The storage unit 5000 stores a relay management DB 5002 configured as the relay management table. The relay management table stores a session ID of a session used to transmit content data between the terminals 10, a data ID of the content data, and an IP address of a stop-request sender terminal that has made a request to stop transmission of the content data, in association with one another.

(Functional Unit of Management System)

The functional units of the management system 50 are described in detail with reference to FIGS. 3 and 4. In the following description of the functional units of the management system 50, a relationship between the functional unit of the management system 50 and hardware for achieving the functional unit illustrated in FIG. 3 is also described. The management system 50 includes a data transmitter/receiver 51, a relay manager 52, and a storing/reading unit 59.

The data transmitter/receiver 51 is implemented by a command from the CPU 501 and by the network I/F 509. The data transmitter/receiver 51 transmits and receives various kinds of data (or information) to and from each terminal, device, or system via the communication network 2.

The relay manager 52 is implemented by a command from the CPU 501 and manages relaying content data between the terminals 10.

The storing/reading unit 59 is implemented by a command from the CPU 501 and by the HDD 505 or is implemented by a command from the CPU 501. The storing/reading unit 59 performs processing to store various kinds of data in the storage unit 5000 and to extract various kinds of data stored in the storage unit 5000.

<<Processes or Operations>>

Processes or operations performed by the terminals 10 and the management system 50 of the communication system 1 are described next.

A sequence performed when the terminal 10a participates in an existing session is described first with reference to FIG. 6. FIG. 6 is a sequence diagram illustrating an example of a process performed when the terminal 10a participates in a session.

First, it is assumed that a session is established among the plurality of terminals 10 (10b, 10c, and 10d) and content data are transmitted/received among the plurality of terminals 10.

In responses to a request for starting communication, the terminal 10a transmits a start request (participation request) for starting communication through the session to the management system 50 (step S1).

The management system 50 authenticates the terminal 10a and permits participation of the terminal 10a in the session (step S2).

The management system 50 relays (transfers) content data from the terminal 10a to the other terminals 10 (10b, 10c, and 10d) that are participating in the session (step S3).

The management system 50 relays (transfers) the content data from the other terminals 10 (10b, 10c, and 10d) that are participating in the session to the terminal 10a (step S4).

The terminal 10a notifies the management system 50 of data indicating a rough indication of the band (bitrate) of the content data transmitted by the terminal 10a (step S5).

The terminal 10a may calculate the rough indication of the band (bitrate) of the content data transmitted by the terminal 10a in the following manner.

The transmission bitrate calculator 17 of the terminal 10a calculates the rough indication of the band on the basis of, for example, the operation capabilities (resolution and frame rate) of the camera 112 of the terminal 10a and data that is set in advance in the transmitting terminal 10a. For example, "data with which the rough indication of the bitrate can be determined from the resolution and the frame rate", such as "the rough indication of the bitrate is 1.5 Mbps in the case where the resolution is a high-definition quality of 720 p and the frame rate is 30 fps" and "the rough indication of the bitrate is 200 Kbps in the case where the resolution is VGA and the frame rate is 15 fps", is stored in advance. The transmission bitrate calculator 17 calculates the rough indication of the bitrate in accordance with the resolution and frame rate currently used.

Alternatively, the transmitting terminal 10a may calculate an average bitrate of video data that has been actually transmitted by the terminal 10a in a past predetermined period and may use the average bitrate as the rough indication of the bitrate.

The management system 50 transfers the notification from the terminal 10a to the other terminals 10 (10b, 10c, and 10d) that are participating in the session (step S6).

The management system 50 notifies the terminal 10a of data indicating the rough indication of the band (bitrate) of each content data transmitted by the other terminals 10 (10b, 10c, and 10d) that are participating in the session (step S7).

The terminal 10a selects one or more items of content data to be received from among the items of content data transmitted from the other terminals 10 (10b, 10c, and 10d) that are participating in the session (step S8).

The terminal 10a requests the management system 50 to stop relaying one or more unselected items of content data (item of content data from the terminal 10b, for example) (step S9).

The management system 50 stops relaying the one or more items of content data for which the request to stop relaying has been made (step S10).

Note that the terminal 10 may calculate data indicating the rough indication of the bitrate instead of being notified by the other terminals 10 via the management system 50 as described above. For example, terminal 10 calculates the rough indication based on the bitrate of an item of content data that has been actually received by the terminal 10 from a corresponding one of the other terminals 10. In this case, the terminal 10 stores the bitrate of the item of content data that has been actually received from a corresponding one of the other terminals 10 in a past predetermined period and may use the average bitrate of those items of content data as the rough indication of the bitrate to be used for reception of the item of data.

Figure 7:
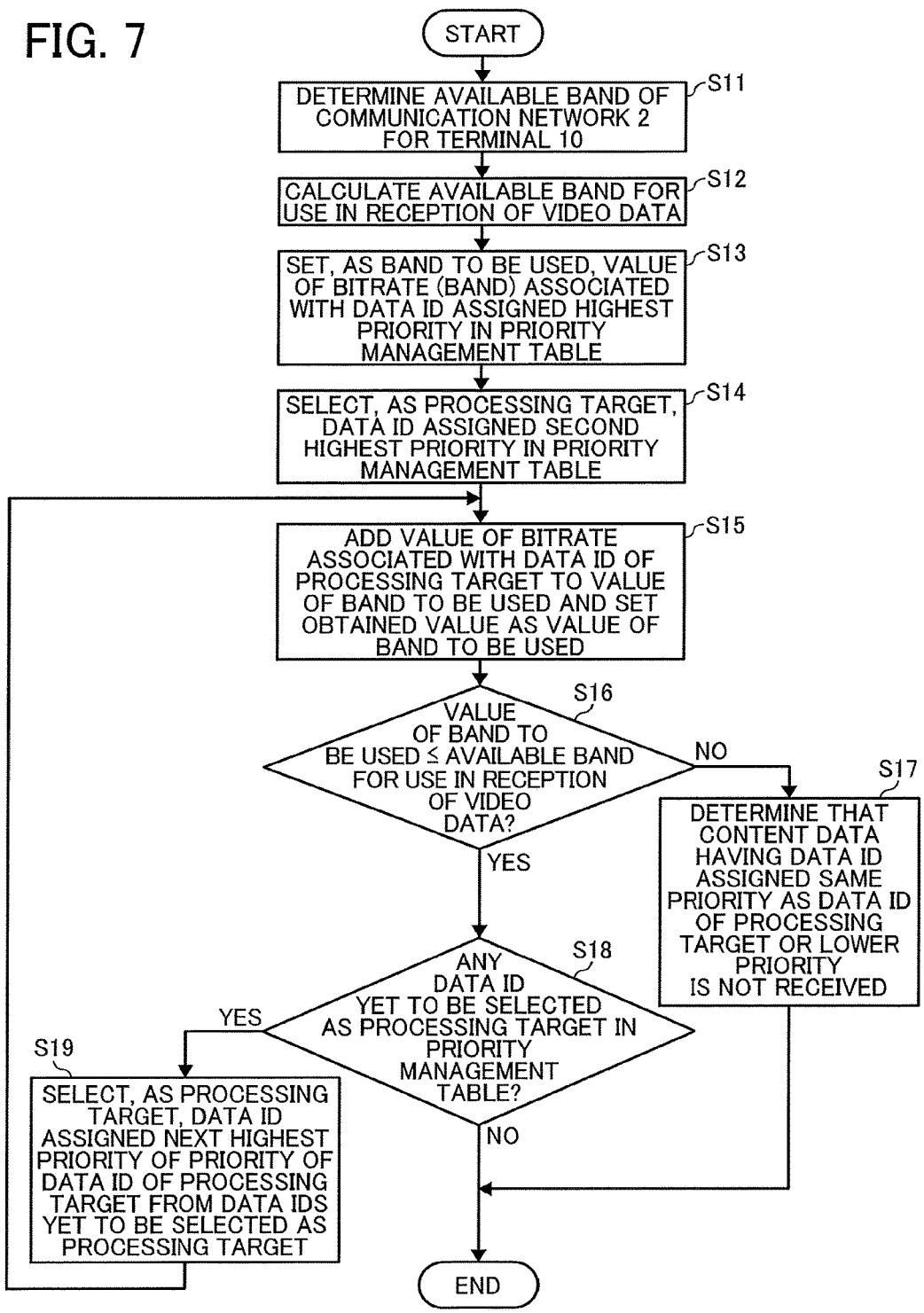
FIG. 7 is a flowchart illustrating an example of a process of selecting content data to be received.

A process of selecting one or more items of content data to be received (step S8 of FIG. 6) is described next with reference to FIG. 7. FIG. 7 is a flowchart illustrating an example of the process of selecting one or more items of content data to be received. Note that this process is performed when the terminal 10 participates in a session and when another terminal 10 exits from the session. This process may be performed also when the available band of the communication network 2 for the terminal 10 has changed, when data stored in the priority management table has been modified, or when an operation is performed to change the setting regarding the number of nodes (terminals 10) for which video images are displayed on a screen.

First, the band manager 15 of the terminal 10 determines the available band of the communication network 2 for the terminal 10 at predetermined intervals, for example (step S11). Any desired method of determining the available band may be applied. Examples of the method include a method for measuring a size of data and a delay time for data transmitted between the management system 50 and the terminal 10 to calculate the available band.

The calculator 16 subtracts a band for use in reception of a control signal and audio data from the determined available band to calculate an available band for use in reception of video data (step S12). Note that the storage unit 1000 may store in advance information regarding a band for use in reception of a control signal and audio data. This configuration allows the calculator 16 to calculate the available band for use in reception of video data based on the information stored in the storage unit 1000.

The calculator 16 obtains a value of the bitrate (band) corresponding to the data ID assigned with the highest priority in the priority management table and sets the obtained value as a value of a band to be used (step S13).

The calculator 16 selects, as a processing target, the data ID assigned with the second highest priority in the priority management table (step S14).

The calculator 16 adds the value of the bitrate corresponding to the data ID selected as the processing target in the priority management table to the value of the band to be used and sets the resultant value as the value of the band to be used (step S15).

The calculator 16 determines whether the value of the band to be used is less than or equal to the available band for use in reception of video data (step S16).

If the value of the band to be used is not less than or equal to the available band for use in reception of video data (NO in step S16), the calculator 16 determines that one or more items of content data assigned with a priority lower than or equal to the priority corresponding to the processing-target data ID are not to be received (step S17) and ends the process. That is, for each data ID for which it is not determined that the corresponding item of content data is not to be received from among the data IDs managed in the priority management table, it is determined that the corresponding item of content data is to be received.

If the value of the band to be used is less than or equal to the available band for use in reception of video data (YES in step S16), the calculator 16 determines whether the priority management table includes one or more data IDs yet to be selected as the processing target (step S18).

If there are one or more data IDs yet to be selected as the processing target (YES in step S18), the calculator 16 selects, as the processing target, the data ID assigned with the next highest priority of the priority of the data ID of the current processing target from among the one or more data IDs yet to be selected as the processing target (step S19). The process then proceeds to step S15. If there is no data ID yet to be selected as the processing target (NO in step S18), the process ends.

<<Detailed Examples of Processes>>

Figure 8:
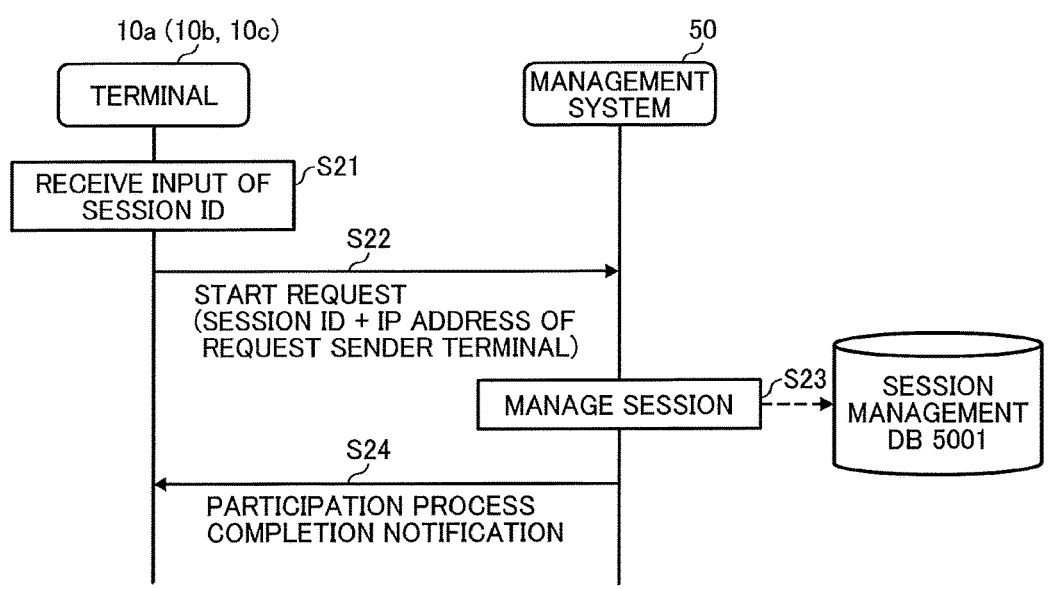
FIG. 8 is a sequence diagram illustrating an example of a process of starting communication between terminals.
Figure 9:
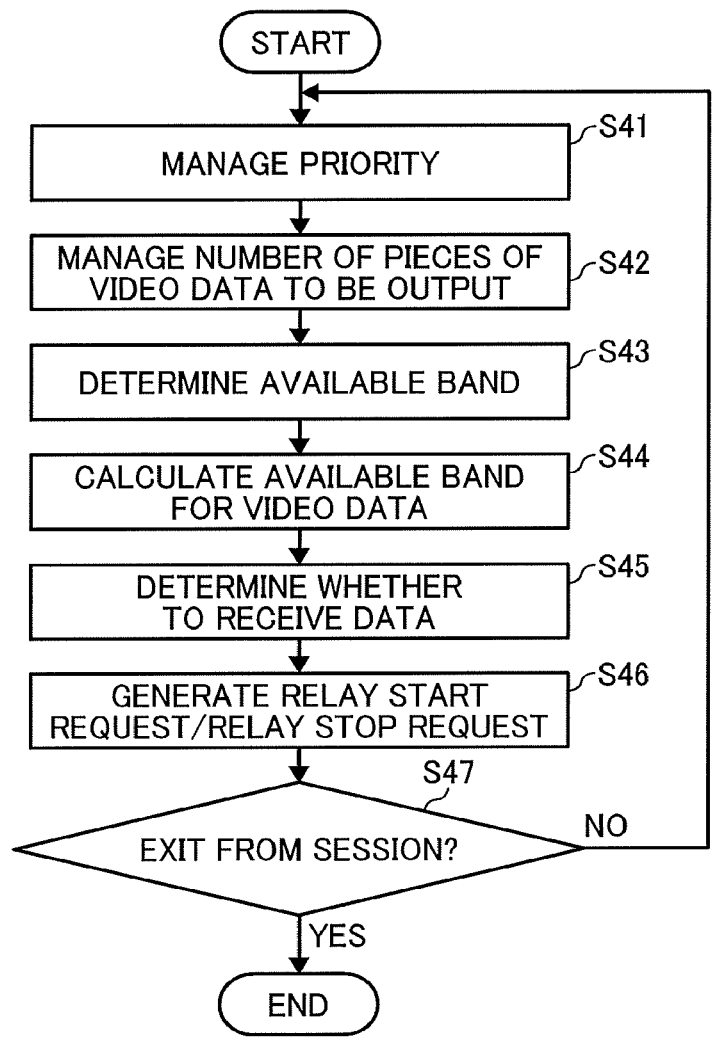
FIG. 9 is a flowchart illustrating an example of a process of making a request to start or stop relaying of content data.
Figure 10:
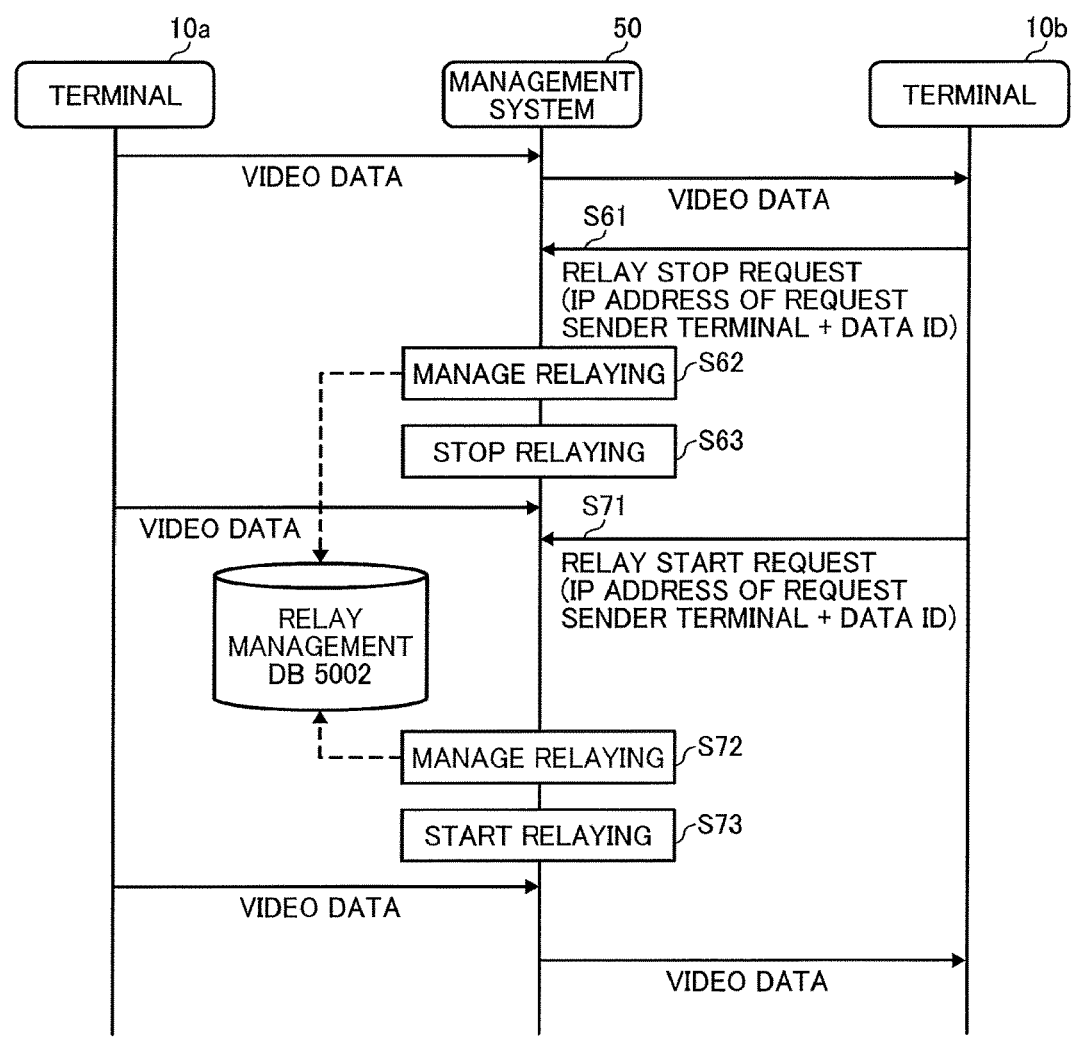
FIG. 10 is a sequence diagram illustrating an example of a process of starting or stopping relaying of content data.

Detailed examples of the processes according to the embodiment is described next with reference to FIGS. 8 to 10.

First, a detailed example of a process of starting communication among some terminals (10a, 10b, and 10c) out of the terminals 10 is described with reference to FIG. 8. FIG. 8 is a sequence diagram illustrating an example of a process of starting communication among the terminals 10. The following description is given on the assumption that the terminals 10a, 10b, and 10c are assigned IP addresses "2.0.0.1", "2.0.0.2", and "2.0.0.3", respectively.

The operation input receiver 12 of the terminal 10a receives an input of a session ID from the user (step S21). Note that the user of each of the terminals 10 participating in the same session is notified of the session ID in advance in accordance with any desired method, for example.

The data transmitter/receiver 11 of the terminal 10a transmits, to the management system 50, a communication start request including the input session ID and the IP address of the terminal 10a serving as a start request sender (step S22).

The data transmitter/receiver 51 of the management system 50 receives the communication start request from the terminal 10a. The storing/reading unit 59 of the management system 50 stores the IP address of the terminal 10a (i.e., the start request sender) as the IP address of the participant terminal in the session management table in association with the session ID included in the communication start request (step S23).

The data transmitter/receiver 51 of the management system 50 establishes a session between the terminal 10a and the management system 50 and transmits a notification indicating that a session participation process has completed successfully to the terminal 10a serving as the start request sender (step S24).

The terminals 10 (10b and 10c) also perform a process that is substantially the same as steps S21 to S24 to participate in the session. In this case, the terminals 10 (10b and 10c) transmit, to the management system 50, the same session ID as the session ID transmitted by the terminal 10a in step S22. In this way, the terminals (10a, 10b, and 10c) can participate in the same session. In the case where it is desirable to distinguish between sessions between the management system 50 and the individual terminals (10a, 10b, and 10c), the management system 50 may assign different session IDs for different combinations of the management system 50 and the individual terminals (10a, 10b, and 10c).

The data transmitter/receiver 11 of the terminal 10a transmits content data, such as video data of a video image captured by the camera 112 of the terminal 10a and audio data of audio collected by the microphone 114 of the terminal 10a, to the management system 50 via the established session. The data transmitter/receiver 51 of the management system 50 receives the video data and the audio data transmitted by the terminal 10a. The data transmitter/receiver 51 of the management system 50 refers to the session management table and transmits the content data received from the terminal 10a to each of the other terminals (10b and 10c) participating in the established session. Likewise, the management system 50 transmits video data and audio data received from the terminal 10b to the other terminals 10a and 10c participating in the established session and transmits video data and audio data received from the terminal 10c to the other terminals 10a and 10b participating in the established session.

A process of making a request to stop or start relaying of content data between the terminals (10a, 10b, and 10c) is described next with reference to FIG. 9. FIG. 9 is a flowchart illustrating an example of a process of making a request to stop or start relaying content data. The case where the terminal 10b makes a request to stop or start relaying of content data is described below as an example.

While the terminal 10b is participating in a session, the priority manager 14 of the terminal 10b manages the priority management table (FIG. 5A) (step S41). For example, when the operation input receiver 12 receives a request to change the priority of reception video data from the user, the priority manager 14 updates the priority management table in accordance with the request.

The priority manager 14 of the terminal 10b also manages the number of items of video data to be output (step S42). For example, when the operation input receiver 12 receives a request to change a layout mode from the user, the priority manager 14 determines the number of items of video data to be output in accordance with the layout mode.

The band manager 15 periodically determines the available band of the communication network 2 for the terminal 10b (step S43).

The calculator 16 subtracts a band used to receive a control signal and audio data from the determined available band to calculate an available band for use in reception of video data (step S44).

The priority manager 14 determines whether to receive video data based on the available band for use in reception of video data, which is calculated by the calculator 16, the number of items of video data to be output, and the priority managed in the priority management table (step S45).

The data transmitter/receiver 11 generates a relay start request or a relay stop request based on the determination of step S45 (step S46). For example, when it is determined that video data, which is not being received currently, is determined to be received, the data transmitter/receiver 11 generates a relay start request for this video data. When it is determined that video data, which is currently being received, is determined not to be received, the data transmitter/receiver 11 generates a relay stop request for this video data. At that time, the data transmitter/receiver 11 includes the data ID of the data for which relaying is to be started or stopped in the relay start request or the relay stop request.

Processing from step S41 to step S46 is repeatedly performed at predetermined timings until the terminal 10b exits from the session (step S47).

The case where the terminal 10b makes a request to start or stop relaying has been described above. The other terminals (10a and 10c) are also capable of making a request to start or stop relaying in the same manner as the process described above.

A process of starting or stopping relaying of content data among the terminals (10a, 10b, and 10c) is described next with reference to FIG. 10. FIG. 10 is a sequence diagram illustrating an example of a process of starting or stopping relaying of content data.

A process of stopping relaying of video data from the terminal 10a to the terminal 10b is described first. The description is continued on the assumption that the data ID of the video data transmitted from the terminal 10a is "V001".

In step S46, after generating a relay stop request including the data ID "V001" of data for which relaying is to be stopped, the data transmitter/receiver 11 of the terminal 10b transmits the generated relay stop request to the management system 50 (step S61). The relay stop request includes the IP address "2.0.0.2" of the terminal 10b that is the request sender.

The data transmitter/receiver 51 of the management system 50 receives the relay stop request. The relay manager 52 of the management system 50 stores the data ID "V001" and the IP address "2.0.0.2", which are included in the relay stop request, in the relay management table in association with each other (step S62). The relay manager 52 stops relaying video data from the terminal 10a to the terminal 10b based on the updated information of the relay management table (step S63). In this way, the video data transmitted by the terminal 10a is no longer relayed to the terminal 10b.

A process performed by the management system 50 to restart relaying of video data from the terminal 10a to the terminal 10b is described next.

In step S46, after generating a relay start request including the data ID "V001" of the data for which relaying is to be started, the data transmitter/receiver 11 of the terminal 10b transmits the generated relay start request to the management system 50 (step S71). The relay start request includes the IP address "2.0.0.2" of the terminal 10b that is the request sender.

The data transmitter/receiver 51 of the management system 50 receives the relay start request. The relay manager 52 of the management system 50 deletes the IP address "2.0.0.2" of the request sender, which is included in the relay start request, from among the IP addresses associated with the data ID "V001" in the relay management table (step S72). The relay manager 52 starts relaying video data from the terminal 10a to the terminal 10b based on the updated information of the relay management table (step S73). In this way, relaying of video data received from the terminal 10a to the terminal 10b is restarted.

Figure 11:
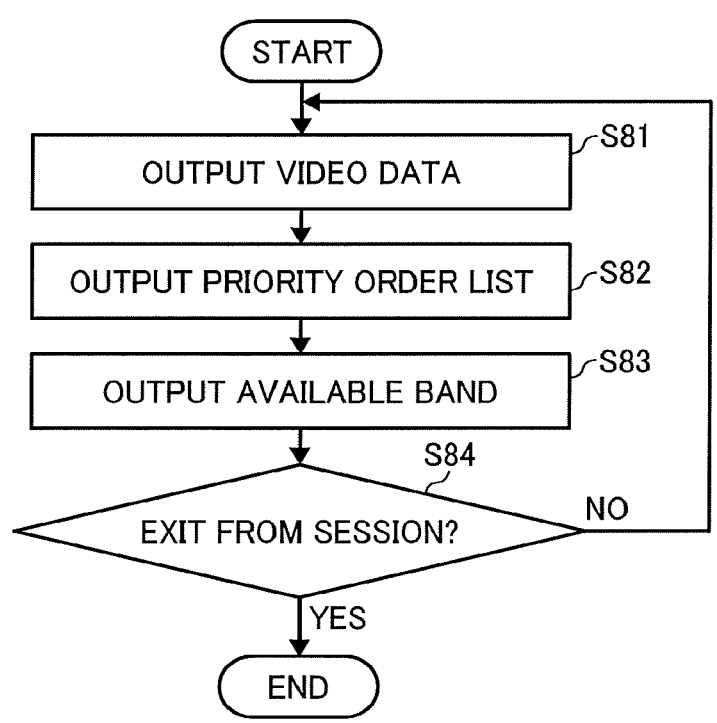
FIG. 11 is a flowchart illustrating an example of a process of displaying an available band.

A process performed by the terminal 10b to display the available band is described next with reference to FIG. 11. FIG. 11 is a flowchart illustrating an example of the process of displaying the available band.

The output control 13 outputs, to the display 120, items of video data received by the data transmitter/receiver 11 (step S81).

<Display Examples>

Figure 12A:
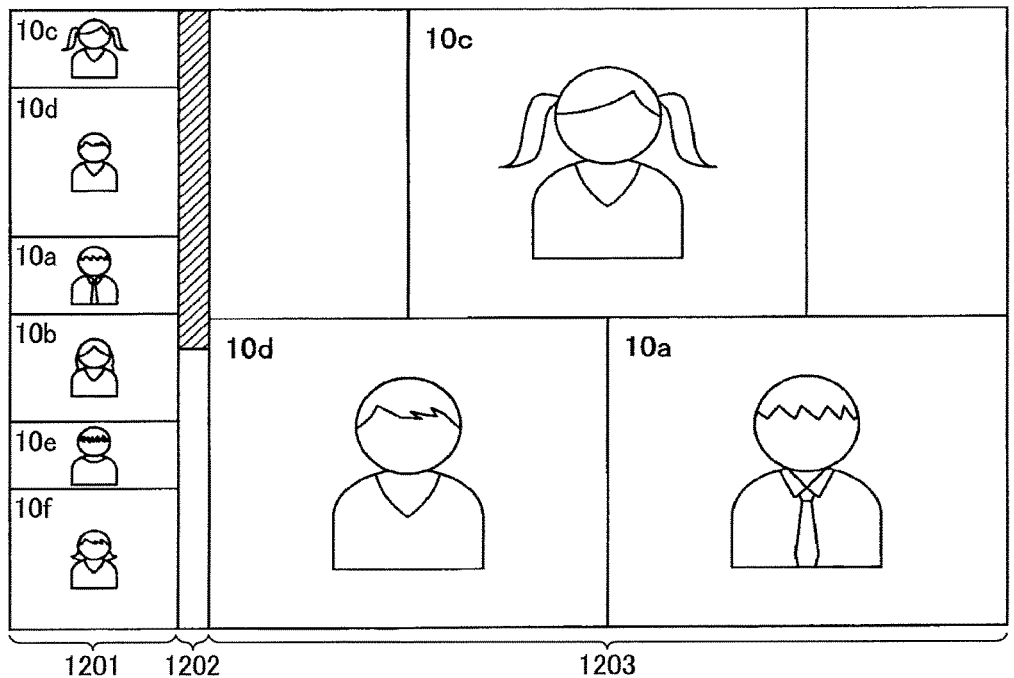
FIGS. 12A and 12B are display examples on a display.
Figure 12B:
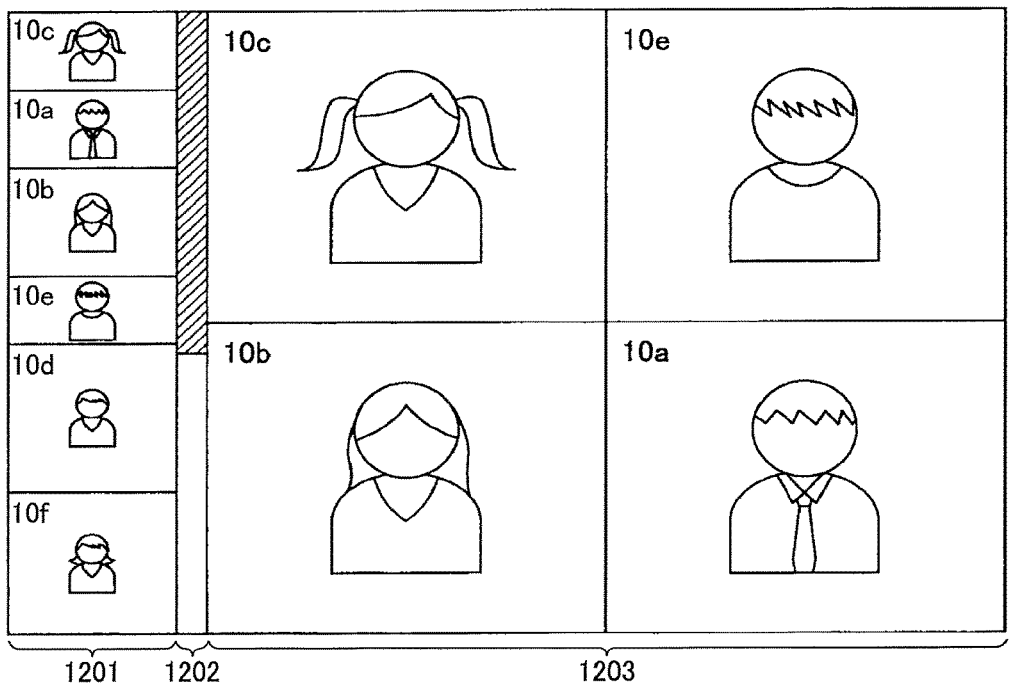

FIGS. 12A and 12B each illustrate a display example on the display 120. Items of video data output by the output control 13 are displayed in a videoconference screen 1203 on the display 120. The number of items of video data to be output changes at any time in accordance with items of video data received by the terminal 10b.

The videoconference screens 1203 illustrated in FIGS. 12A and 12B are an example illustration of images of video data being output using an example output method. For example, display areas each having an identical size are generated as many as the number of items of video data to be received at a substantially same time, and the received items of video data are output in the respective display areas. In another example, the number of display areas is kept the same. That is, a video image is displayed on the corresponding display area based on video data being received. When transmission of the video data is stopped, the corresponding display area is switched to display a still image of the previous video image.

Referring back to FIG. 11, the output control 13 outputs, in a priority order list display area 1201 of the display 120, thumbnails of respective items of video data in order of reception priority of the items of video data managed in the priority management table (step S82). Each of the thumbnails is a still image generated at a given timing from a corresponding one of the items of video data received from the terminals 10. Note that in place of the thumbnails, names set for the respective content-data sender terminals 10 may be displayed as text or icons for the respective nodes (terminals 10) may be generated and displayed. Further, thumbnails need not necessarily be still images generated from the corresponding items of video data and may be still images managed in association with the respective terminals 10 in advance. Such a case can be achieved by receiving still images from the management system 50 or the respective terminals 10.

According to an embodiment, video data displayed at an upper portion of the priority order list display area 1201 has a higher priority, and video data displayed at a lower portion of the priority order list display area 1201 has a lower priority. The ranking in the priority order list is dynamically updated in response to processing of step S41. In addition, the priority ranking may be automatically updated in accordance with the commenting states of the individual participants.

Frames for the items of video data displayed in the priority order list display area 1201 are each displayed in a size based on the bitrate stored in the priority management table for the item of video data transmitted by the corresponding terminal 10. The size of the frames may be proportional to the bitrate, for example.

The output control 13 outputs, in a graph display area 1202 of the display 120, a graph that represents a value of the available band usable for reception of video data (available band for use in reception of video data) in association with the items of video data received from the respective terminals 10 (step S83). The available band usable for reception of video data and the number of receivable items of video data are calculated in step S44 at a given timing.

The upper end of the graph display area 1202 indicates that the number of receivable items of video data is zero, that is, the available band is zero. As this graph extends toward the bottom, the value of the available band increases and the available band becomes wider. The output control 13 outputs the graph to be adjacent to the thumbnails displayed in the priority order list display area 1201. At that time, the output control 13 outputs the graph such that the height of a thumbnail corresponds to a band to be used to receive the corresponding item of video data. For example, in the case where the determined available band is 2 Mbps and bands used to receive respective items of video data are 1 Mbps, 750 kbps, and 500 kbps, the output control 13 outputs a graph that extends to a position corresponding to a half the height of the third thumbnail from the upper end of the graph display area 1202.

Viewing the graph in association with the thumbnails of the priority order list, the user can intuitively grasp video data that becomes viewable when the network environment improves or video data that is no longer viewable when the network environment worsens.

The user can also grasp based on the display example of FIG. 12A that video data can be output even if another terminal 10 further participates in the session since the available band is surplus.

The state of the available band is the same in the display example of FIG. 12B as that of FIG. 12A. FIG. 12B, however, illustrates an example of the case where the priority of the terminal 10*d* that requires a higher bitrate is lowered since the priority rankings of items of video data are modified through a user operation. Consequently, the number of receivable items of video data, which is three in FIG. 12A, increases to four in FIG. 12B. Accordingly, the number of the other terminals 10 for which items of video images are displayed in the videoconference screen 1203 increases from three to four.

Note that the processing of steps S81 to S83 is repeatedly performed until the terminal 10*b* exists from the session (step S84).

While the method allowing the terminal 10*b* to output the graph of the available band has been described above, the other terminals 10 (10*a* and 10*c*) are also capable of outputting the available band through a process that is substantially the same as that of steps S81 to S84.

As described above, according to the embodiment, a terminal selects one or more receivable item of content data from among items of content data in accordance with the available band of a communication network and bands to be used to receive the respective items of content data and displays information indicating the available band in association with bands to be used to receive the one or more selected receivable items of content data. This configuration allows the user to grasp a relationship between the network environment and the receivable of content data.

Programs for the terminals 10 and the management system 50 may be stored on a computer-readable recording medium (such as the recording medium 106) as a file of an installable or executable format and be distributed. Other examples of the recording medium include a Compact Disc-Recordable (CD-R), a Digital Versatile Disc (DVD), and a Blu-ray disc.

In addition, a recording medium, such as a CD-ROM, storing the programs according to the embodiment and the HD 504 storing these programs can be provided as program products in this country and other countries.

The terminals 10 and the management system 50 may each be configured as a single computer or as a plurality of computers that is assigned the individual divisional units (functions) in a given manner.

In the priority management table, the session management table, and the relay management table used in the embodiment, the IP address of each terminal is used as information for identifying the terminal to manage the terminal. However, the information need not necessarily be the IP address and may be a communication ID for identifying a communication counterpart. The communication ID may be terminal identification information for identifying each terminal or identification information for identifying each user. In the case where the management system 50 and the terminals 10 control communication by using the communication ID other than the IP address, each of the terminals 10 transmits the communication ID as well as the IP address of the terminal 10 to the management system 50. In this way, the management system 50 can manage the communication IDs corresponding to the respective terminals 10.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. A communication terminal, comprising:
a receiver to receive a plurality of items of content data respectively from a plurality of counterpart communication terminals through a session established between the communication terminal and the counterpart communication terminals via a communication network;
a display to display the plurality of items of content data, the display including
a first display area displaying thumbnails of the content data received from the plurality of counterpart communication terminals or a name of the plurality of counterpart communication terminals,
a second display area displaying a value of an available bandwidth of the communication network to receive the content data from the plurality of counterpart communication terminals, in association with the thumbnails of the content data from the plurality of counterpart communication terminals, and
a third display area displaying the content data; and
circuitry to:
determine the available bandwidth of the communication network;
select, from among the displayed plurality of items of content data, one or more items of content data receivable by the communication terminal in accordance with the available bandwidth of the communication network and bands being used to receive the plurality of items of content data; and
control the display to display information indicating the available bandwidth of the communication network in association with the selected one or more items of content data receivable by the communication terminal.

2. The communication terminal according to claim 1, further comprising:
a memory to store, for each one of the plurality of items of content data, priority information indicating a priority of the plurality of items of content data,
wherein the circuitry is further configured to control to start or stop reception of each of the plurality of items of content data in accordance with the bands being used to receive the plurality of items of content data and the priority information of the plurality of items of content data.

3. The communication terminal according to claim 2, wherein the circuitry is further configured to control the display to display, in association with the available bandwidth of the communication network, the bands being used to receive the plurality of items of content data in order of the priorities indicated by the stored priority information.

4. The communication terminal according to claim 2, wherein the circuitry is further configured to receive an input of a setting of a priority for at least one item of the plurality of items of content data, and
wherein the memory stores the priority information for the at least one item of the plurality of items of content data in accordance with the received setting of the priority.

5. The communication terminal according to claim 1, further comprising:
a transmitter to transmit information indicating starting or stopping of transmission of at least one item of the plurality of items of content data to a communication apparatus configured to transmit the plurality of items of content data.

6. A communication system comprising:
the communication terminal according to claim 5; and
the communication apparatus.

7. The communication system according to claim 6, wherein the communication apparatus starts or stops transmission of the content data in accordance with the information transmitted from the communication terminal.

8. The communication terminal of claim 1, wherein the display displays items in the first display area in an order determined by a priority ranking assigned to each of the items.

9. The communication terminal of claim 1, wherein the display displays each item in the first display area with a frame having a size that is based on a bitrate associated with the item.

10. A communication control method, comprising:
receiving a plurality of items of content data respectively from a plurality of counterpart communication terminals through a session established between the communication terminal and the counterpart communication terminals via a communication network;
displaying, on a display, the plurality of items of content data, including
displaying, in a first display area, thumbnails of the content data received from the plurality of counterpart communication terminals or a name of the plurality of counterpart communication terminals,
displaying, in a second display area, a value of an available bandwidth of the communication network to receive the content data from the plurality of counterpart communication terminals, in association with the thumbnails of the content data from the plurality of counterpart communication terminals, and
displaying, in a third display area, the content data;
determining the available bandwidth of the communication network;
selecting, from among the displayed plurality of items of content data, one or more items of content data receivable by the communication terminal in accordance with the available bandwidth of the communication network and bands being used to receive the plurality of items of content data; and
displaying, on the display, information indicating the available bandwidth of the communication network in association with the selected one or more items of content data receivable by the communication terminal.

11. A non-transitory recording medium which, when executed by one or more processors, cause the processors to perform a communication control method comprising:
receiving a plurality of items of content data respectively from a plurality of counterpart communication terminals through a session established between the communication terminal and the counterpart communication terminals via a communication network;
displaying, on a display, the plurality of items of content data, including
displaying, in a first display area, thumbnails of the content data received from the plurality of counterpart communication terminals or a name of the plurality of counterpart communication terminals,
displaying, in a second display area, a value of an available bandwidth of the communication network to receive the content data from the plurality of counterpart communication terminals, in association with the thumbnails of the content data from the plurality of counterpart communication terminals, and
displaying, in a third display area, the content data;
determining the available bandwidth of the communication network;
selecting, from among the displayed plurality of items of content data, one or more items of content data receivable by the communication terminal in accordance with the available bandwidth of the communication network and bands being used to receive the plurality of items of content data; and
displaying, on the display, information indicating the available bandwidth of the communication network in association with the selected one or more items of content data receivable by the communication terminal.

* * * * *